United States Patent [19]

Kim

[11] Patent Number: 5,695,277
[45] Date of Patent: Dec. 9, 1997

[54] LIGHT SOURCE APPARATUS FOR GENERATING PARALLEL LIGHT HAVING DUAL-MIRRORS FOR ELIMINATING LAMP SHADOW EFFECTS

[75] Inventor: Dong-ha Kim, Suwon, Rep. of Korea

[73] Assignee: Samsung Electronics Co., Ltd., Kyungki-Do, Rep. of Korea

[21] Appl. No.: 523,534

[22] Filed: Sep. 5, 1995

[30] Foreign Application Priority Data

Oct. 28, 1994 [KR] Rep. of Korea ............... 94-27958

[51] Int. Cl.$^6$ ........................................ F21V 7/08
[52] U.S. Cl. .................. 362/299; 362/298; 362/303
[58] Field of Search ........................... 362/298, 299, 362/300, 302, 303, 304, 305, 328, 346

[56] References Cited

U.S. PATENT DOCUMENTS

| | | | |
|---|---|---|---|
| 2,198,014 | 4/1940 | Ott | 362/303 |
| 2,787,701 | 4/1957 | Rosin | 362/302 |

FOREIGN PATENT DOCUMENTS

| | | | |
|---|---|---|---|
| 708577 | 5/1931 | France | 362/298 |
| 125086 | 4/1928 | Germany | 362/298 |
| 379568 | 9/1932 | United Kingdom | 362/299 |
| 385456 | 12/1932 | United Kingdom | 362/299 |

*Primary Examiner*—Thomas M. Sember
*Attorney, Agent, or Firm*—Sughrue, Mion, Zinn, Macpeak & Seas, PLLC

[57] ABSTRACT

A light source apparatus for generating parallel light is equipped with dual mirrors to compensate for a shadow cast by the lamp itself. The apparatus includes an elliptical reflector and a light source located at the near focal point of the elliptical reflector. A first mirror having an aperture in the center thereof, for reflecting rays emitted directly from the light source back toward the light source, and a second mirror positioned directly in front of the light source, for reflecting the rays reflected from the first mirror and passing the rays through the aperture of the first mirror are provided. A collimating lens is provided for forming parallel light by focusing the rays passed through the aperture of the first mirror, thereby being used as the light source or other element of an optical instrument which requires a highly uniform parallel light source.

8 Claims, 3 Drawing Sheets

FIG.3A
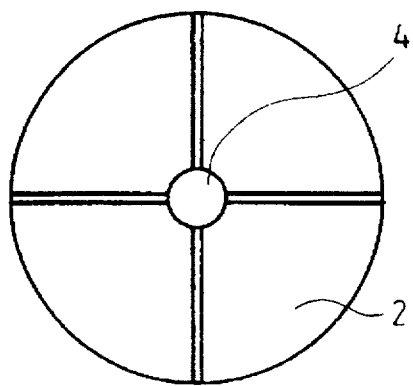
FIG.3B
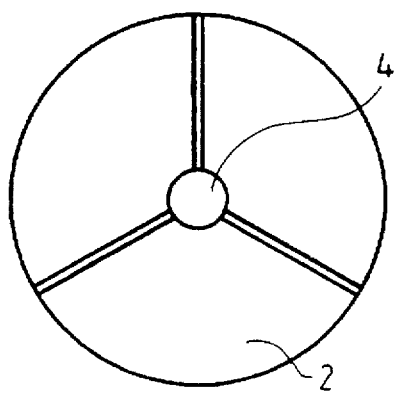
FIG.4A
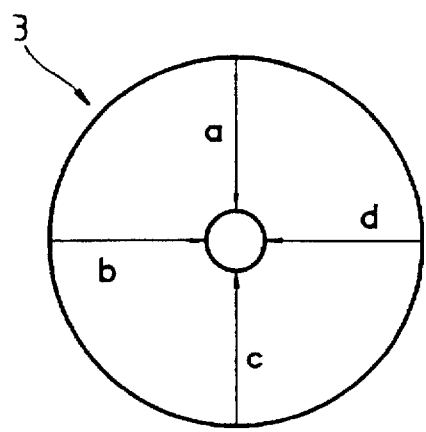
FIG.4B   FIG.4C
FIG.4D   FIG.4E
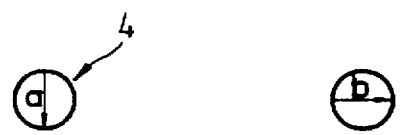

LIGHT SOURCE APPARATUS FOR GENERATING PARALLEL LIGHT HAVING DUAL-MIRRORS FOR ELIMINATING LAMP SHADOW EFFECTS

BACKGROUND OF THE INVENTION

The present invention relates to a light source apparatus for generating parallel light and, more particularly, to a light source apparatus, for generating parallel light, having dual mirrors in order to remove lamp shadow effects.

In the conventional art for generating parallel light using an elliptical reflector (mirror), a small area of relatively low light intensity is undesirably formed around the central axis of the parallel light, due to the shadow cast by the lamp itself. There is, of course, light emanating directly from the lamp. This light, however, cannot compensate for the loss of light intensity occurring in the shadow area, because the directly emanating light is unfocused and weakens as it advances since it is not parallel light.

The conventional art for generating parallel light by using an elliptical reflector is shown in FIG. 1. The apparatus for generating a parallel light is composed of a light source 1, such as a metal halide lamp, an elliptical reflector 2 having the light source 1 located at its focus, a stop 7 located in front of the light source 1 and a lens 6. The hatched section 8 indicates an area having decreased light intensity caused by the shadow of the lamp 1. Here, the light originating from the lamp 1 located at the near focal point of elliptical reflector 2 is reflected by elliptical reflector 2, to converge on the far focal point thereof which is located at an aperture in the stop 7, after which the light diverges and is formed into parallel light (i.e., collimated) by the lens 6 whose focal point also coincides with the aperture in the stop 7.

The decreased light intensity of the hatched section 8 may be a fatal defect depending on the purpose for which the parallel light is to be used. Therefore, the decreased light intensity should be compensated, and a few correlated matters to be considered in compensating the decreased light are as follows: a problem of determining the size of one mirror 3 when the size of the other mirror 4 near to a lamp 1 is determined according to the size of the lamp's shadow that is a cross-sectional area of the lamp 1; a problem of the distance between a lamp 1 and the mirror 3 pertaining to the size determination; a problem of the consistency between the focal point made by the two mirrors and the focal point of an elliptical reflector; and a problem of a parallel procession of all the rays which are passed through a lens 6 by making the focal point of a lens precisely congruous with the aforesaid consistent focal point.

SUMMARY OF THE INVENTION

To solve the above problems, it is an object of the present invention to provide a light source apparatus using an elliptical reflector, in which dual mirrors are provided to generate parallel light with no lamp shadow effects.

Accordingly, to achieve the above object, there is provided a light source apparatus for generating parallel light according to an embodiment of the present invention, comprising: an elliptical reflector defining a near focal point and a far focal point; a light source located at the near focal point of the elliptical reflector, the elliptical reflector reflecting light rays emitted from the light source; a first mirror, having an aperture in the center thereof, for reflecting light rays emitted directly from the light source back toward the light source; a second mirror, positioned directly in front of the light source, for reflecting the light rays reflected from the first mirror, the light rays reflected from the second mirror passing through the aperture of the first mirror; and a collimating lens for forming parallel light by focusing the light rays passed through the aperture of the first mirror.

To achieve the above object, there is provided another light source apparatus according to another embodiment of the present invention, comprising: an elliptical reflector defining a near focal point and a far focal point; a light source located at the near focal point of the elliptical reflector, the elliptical reflector reflecting light rays emitted from the light source; a first mirror positioned offset from the optical axis between the light source and the far focal point of the elliptical reflector and for reflecting light rays emitted directly from the light source back toward the light source; a second mirror, positioned directly in front of the light source, for reflecting the light rays reflected from the first mirror; and a collimating lens for forming parallel light by focusing the light rays coming from the elliptical reflector and the light rays reflected from the second mirror.

BRIEF DESCRIPTION OF THE DRAWINGS

The above objects and advantages of the present invention will become more apparent by describing in detail preferred embodiments thereof with reference to the attached drawings, in which:

FIGS. 3A and 3B are views showing the methods of installing a second mirror on an elliptical reflector;

FIGS. 4A, 4B, 4C, 4D and 4E are views illustrating the optical correspondence between first and second mirrors.

DETAILED DESCRIPTION OF THE PREFERRED EMBODIMENTS

Figure 1:
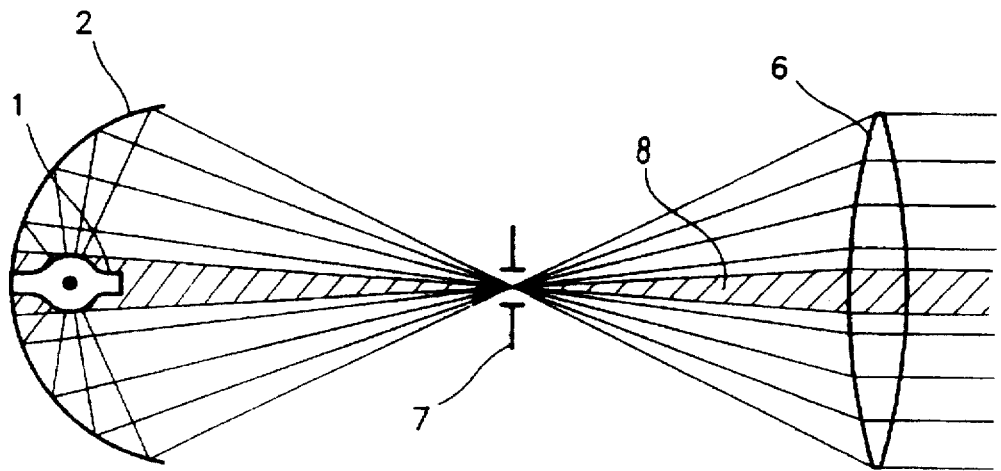
FIG. 1 is a view illustrating a conventional light source apparatus for generating parallel light using an elliptical reflector.
Figure 2:
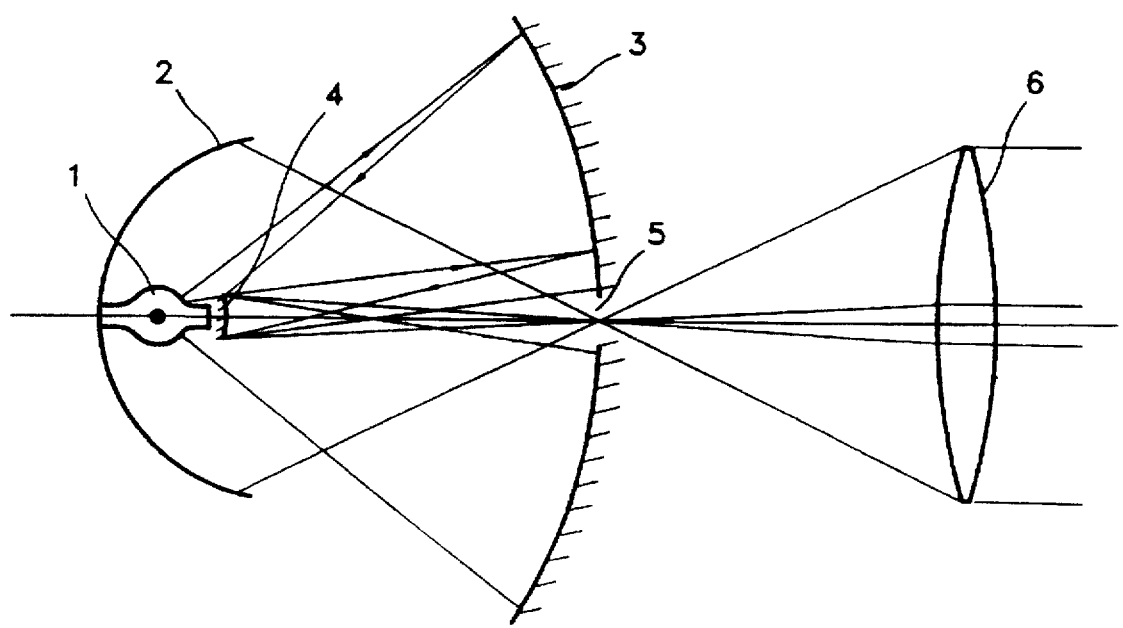
FIG. 2 is a view illustrating a light source apparatus for generating parallel light, according to the present invention.

FIG. 2 shows a method of generating parallel light by using an elliptical reflector equipped with double mirrors according to the present invention. In such an apparatus for a light source generating parallel light, a metal halide lamp 1 lies at the focal point of an elliptical reflector 2, and light emitted from the lamp 1, after being reflected by the elliptical reflector 2, goes to a collimating lens 6 which forms parallel light. A first mirror 3, having an aperture 5 at its center for the passing of the rays heading for the lens 6, reflects the rays emanated directly from the lamp 1 to a second mirror 4. The second mirror 4 is located in front of the lamp 1, and concentrates and reflects to the lens 6 the rays reflected from first mirror 3. The lens 6 collects the reflected rays and forms parallel light.

To obtain a satisfactory result from the above-described apparatus, certain conditions should be met.

First, the rays reflected from the elliptical reflector 2 have to focus at the same point as the focal point of the lens 6 formed around the aperture 5, i.e., the far focal point of the elliptical reflector 2 should be congruous with that of the lens 6. Also, the rays reflected from the second mirror 4 have to focus at the same focal point of the lens 6. In the drawings, though second mirror 4 is shown as a convex mirror, a concave mirror can be used, if necessary, since the focal point of the second mirror 4 is formed in relation to the first mirror 3. That is to say, in order to adjust the focal distance of the first mirror 3 that of the second mirror 4 can be modified, accordingly.

Second, a condition of compensation for the loss of light intensity caused by the shadow of lamp 1 is to be considered. Besides the deficiency of light intensity, the excess of light intensity also can be a problem. Thus, the conditions have to be decided accurately and to be fully satisfied. The condition is satisfied by two decisive elements: one is the distance between the lamp 1 and the first mirror 3, and the other is an effective area of the first mirror 3. The effective area can be decided according to the prior decision of the distance between the lamp 1 and the first mirror 3, and also, a reverse method is available. Here, adopting the former method is useful in regard to the correlation of the other elements. Illumination is in proportion to the luminous intensity of a light source, and in inverse proportion to the square of distance. Thus, the light intensity for compensation satisfying the condition is decided by the distance between the lamp 1 and the elliptical reflector 2 and the area of the lamp's shadow. The area of the first mirror 3 can be calculated using a relevant formula:

$$S_1/d_1^2 = S_2/d_2^2$$

Here, $S_1$ and $d_1$ are an area of the shadow of lamp 1 and a distance from the lamp 1 to the elliptical reflector 2, respectively. $S_2$ and $d_2$ are an area of the first mirror 3 and a distance from the lamp 1 to the first mirror 3, respectively. The above formula is, of course, for a conceptive explanation only, and can be applied directly for a case that an area is easily calculated and the distance is uniform, i.e., under ideal conditions.

Third, a second mirror must be installed precisely and stably; namely, the installation of the mirror has to minimize the influence on the light path. As with the first mirror, accurate position and direction have to be maintained stably in the second mirror 4. If the position and direction of second mirror 4 is twisted a bit, an area having deficient or excess light intensity is formed in a light beam, which causes an undesirably shaded image on a screen. As shown in FIGS. 3A and 3B, there is a method of fixing the second mirror 4 on the elliptical reflector 2 using 3 or 4 spokes. A stable material which can endure the high temperature of a lamp has to be used for the spoke. In general, the material used to form the skeleton of the reflector is selected, and a super alloy, such as Hastelloy or Inconel, can be used, too. Also, welding is preferred to fix the spoke with certainty and stability, however, when a welding method is not easy because of using a different kind of material from the material forming the skeleton of the reflector, or the deformation by welding affects the accuracy of an apparatus, fastening the spoke by using a rivet can be considered.

Fourth, a problem of the congruence of the first and second mirrors is to be considered. Here, the congruence means that light intensity is uniformly formed and delivered, and that a focal point made by using two mirrors is located at its regular position. Thus, the two mirrors are designed correlatively. Undoubtedly, it is desirable that the points on a surface of the first mirror 3 are spaced apart from lamp 1 at the same distance. Because an aperture through which converging rays pass is made in the first mirror 3, when the first and second mirrors have a one-to-one correspondence, an area having decreased light intensity is formed in the center of first mirror 3. Hence, first mirror 3 is formed to reflect light as shown in FIG. 4, and the light from the first mirror 3 falls overlapped on second mirror 4. In FIG. 4A, the light projected from the first mirror 3 is expressed using constituents a, b, c and d. Also, in FIGS. 4B, 4C, 4D and 4E, the light constituents projected to the second mirror 4 are expressed as a, b, c and d, respectively. To indicate the direction of a constituent, each constituent is expressed with an arrow. Consequently, the two constituents of the first mirror 3, e.g., the constituents a and c, overlap on second mirror 4. Of course, since such an overlapping is intended, light intensity is set up in consideration of the overlapping, by which the problem of an area having decreased light intensity caused by the aperture of first mirror 3 is solved.

Figure 5:
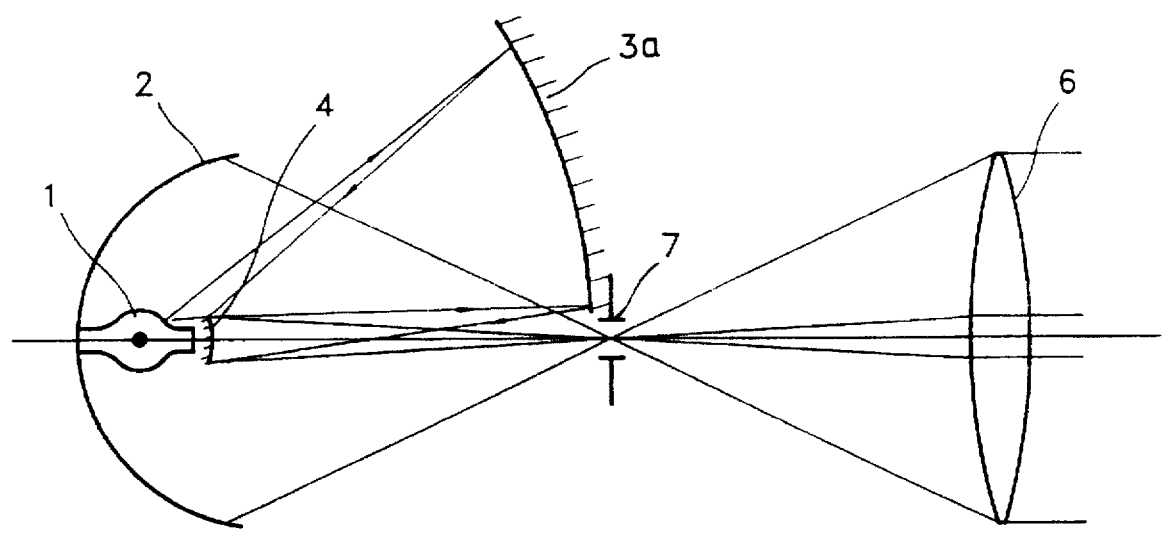
FIG. 5 is a view illustrating another embodiment of the present invention.

FIG. 5 shows another embodiment of a light source apparatus for generating parallel light according to the present invention. Like elements are denoted with like reference numerals. Here, a first mirror 3a is positioned offset from the optical axis formed between the light source 1 and the far focal point of said elliptical reflector. In this type of apparatus, i.e., with the first mirror 3a offset from the optical axis, no aperture needs to be formed at the center of the first mirror but rather a stop 7 having an aperture is used, and the first mirror 3a can be installed beside the optical axis formed between the second mirror 4 and lens 6.

Adopting this embodiment relates to the size of a cross-sectional area of the lamp 1; that is, the embodiment is preferably adopted when the above cross sectional area is small. And in this embodiment, a plurality of first mirrors 3a may be installed according to the application, since frames or spokes of the first mirror 3a can be installed easily without affecting the light path.

As described above, a uniform parallel light beam can be obtained by compensating the loss of light intensity caused by the shadow of a lamp by the present invention. The parallel light can be used as the light source or other element of an optical instrument which requires a highly uniform parallel light source.

It is contemplated that numerous modifications may be made to the light source apparatus of the present invention without departing from the spirit and scope of the invention as defined in the following claims.

What is claimed is:

1. A light source apparatus for generating parallel light, comprising:

an elliptical reflector defining a near focal point and a far focal point;

a light source located at the near focal point of said elliptical reflector, said elliptical reflector reflecting light rays emitted from the light source;

a first mirror, having an aperture in a center thereof, for reflecting light rays emitted directly from said light source back toward said light source, the aperture of said first mirror being positioned at the far focal point of said elliptical reflector;

a second mirror, positioned directly in front of said light source, for reflecting the light rays reflected from said first mirror, the light rays reflected from said second mirror passing through the aperture of said first mirror; and a collimating lens for forming parallel light by focusing the light rays passed through the aperture of said first mirror.

2. The light source apparatus of claim 1, wherein the far focal point of said elliptical reflector is congruous with the focal point of the collimating lens.

3. The light source apparatus of claim 1, wherein the second mirror is one of at least a concave and a convex mirror.

4. The light source apparatus of claim 1, wherein the second mirror is fixed on the elliptical reflector using a plurality of spokes.

5. The light source apparatus of claim 1, wherein the light rays projected from the first mirror fall overlapped on the second mirror to prevent a decrease in light intensity.

6. A light source apparatus for generating parallel light, comprising:

an elliptical reflector defining a near focal point and a far focal point;

a light source located at the near focal point of said elliptical reflector, said elliptical reflector reflecting light rays emitted from said light source;

a first mirror positioned offset to one side of the optical axis between said light source and the far focal point of said elliptical reflector and for reflecting light rays emitted directly from said light source back toward said light source;

a second mirror, positioned directly in front of said light source, for reflecting the light rays reflected from said first mirror; and a collimating lens for forming parallel light by focusing the light rays coming from said elliptical reflector and the light rays reflected from said second mirror.

7. The light source apparatus of claim 6, further comprising a stop having an aperture so as to allow the light rays to reach the collimating lens.

8. The light source apparatus of claim 6, wherein the cross-sectional area of the light source is small compared to the elliptical reflector and allows a plurality of first mirrors to be installed.

* * * * *